(12) United States Patent
Seo et al.

(10) Patent No.: US 9,467,272 B2
(45) Date of Patent: Oct. 11, 2016

(54) METHOD FOR TRANSMITTING/RECEIVING DOWNLINK CONTROL INFORMATION IN WIRELESS COMMUNICATION SYSTEM AND DEVICE THEREFOR

(75) Inventors: Inkwon Seo, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 14/115,038

(22) PCT Filed: May 1, 2012

(86) PCT No.: PCT/KR2012/003388
§ 371 (c)(1),
(2), (4) Date: Oct. 31, 2013

(87) PCT Pub. No.: WO2012/150793
PCT Pub. Date: Nov. 8, 2012

(65) Prior Publication Data
US 2014/0071929 A1  Mar. 13, 2014

Related U.S. Application Data

(60) Provisional application No. 61/482,204, filed on May 3, 2011.

(51) Int. Cl.
*H04L 5/00* (2006.01)
*H04W 72/04* (2009.01)

(52) U.S. Cl.
CPC .......... *H04L 5/0085* (2013.01); *H04L 5/0053* (2013.01); *H04W 72/042* (2013.01); *H04L 5/001* (2013.01); *H04L 5/0037* (2013.01); *H04L 5/0048* (2013.01)

(58) Field of Classification Search
CPC . H04L 5/0053; H04L 1/1854; H04L 5/0007; H04L 27/2602; H04L 1/1812; H04L 5/0055; H04W 88/08; H04W 52/0216; H04W 72/005; H04W 72/1278; H04W 72/0406; H04W 28/18; H04W 72/02; H04W 72/042; H04W 72/00; H04W 72/0446; H04W 72/14; H04W 72/1289; H04J 3/1694; H04J 11/00
USPC ........ 370/329, 280, 336, 252, 328; 455/450, 455/422.1, 509, 517
See application file for complete search history.

(56) References Cited

U.S. PATENT DOCUMENTS

| 2007/0165731 A1 | 7/2007 | Xiao et al. |
| 2011/0044261 A1* | 2/2011 | Cai ................ H04L 5/0053 370/329 |

(Continued)

FOREIGN PATENT DOCUMENTS

| KR | 10-2007-0093657 A | 9/2007 |
| KR | 10-2010-0014179 A | 2/2010 |

(Continued)

*Primary Examiner* — Charles C Jiang
*Assistant Examiner* — Rose Clark
(74) *Attorney, Agent, or Firm* — Birch, Stewart, Kolasch & Birch, LLP (57) ABSTRACT

Disclosed in the present invention is a method for a terminal to receive a downlink signal from a base station in a wireless communication system. More particularly, the present invention comprises the steps of: receiving downlink control information from the base station in a data region of a first subframe; and receiving downlink data in a data region of a second subframe, on the basis of the downlink control information, wherein the second subframe is a subframe available after a preset number of subframes from the first subframe.

12 Claims, 8 Drawing Sheets

(56) References Cited

U.S. PATENT DOCUMENTS

| | | |
|---|---|---|
| 2011/0044391 A1 | 2/2011 | Ji et al. |
| 2011/0064037 A1* | 3/2011 | Wei .................. H04W 72/1289 370/329 |
| 2011/0122825 A1 | 5/2011 | Lee et al. |
| 2011/0164585 A1 | 7/2011 | Yu et al. |
| 2011/0222491 A1* | 9/2011 | Vajapeyam et al. .......... 370/329 |
| 2011/0228731 A1* | 9/2011 | Luo et al. .................... 370/329 |
| 2011/0243066 A1* | 10/2011 | Nayeb Nazar et al. ...... 370/328 |
| 2011/0268062 A1* | 11/2011 | Ji .......................... H04L 5/0055 370/329 |
| 2012/0252447 A1* | 10/2012 | Sartori .................. H04W 48/12 455/434 |

FOREIGN PATENT DOCUMENTS

| | | |
|---|---|---|
| KR | 10-2011-0030607 A | 3/2011 |
| WO | WO 2010/050704 A2 | 5/2010 |

\* cited by examiner

(a) control plane protocol stack (b) user plane protocol stack

METHOD FOR TRANSMITTING/RECEIVING DOWNLINK CONTROL INFORMATION IN WIRELESS COMMUNICATION SYSTEM AND DEVICE THEREFOR

CROSS REFERENCE TO RELATED APPLICATIONS

This application is the National Phase of PCT/KR2012/003388 filed on May 1, 2012, which claims priority under 35 U.S.C. 119(e) to U.S. Provisional Application No. 61/482,204 filed on May 3, 2011, all of which are hereby expressly incorporated by reference into the present application.

TECHNICAL FIELD

The present invention relates to a wireless communication, and more particularly, to a method of transmitting/receiving a downlink control information in a wireless communication system and an apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

Figure 1:
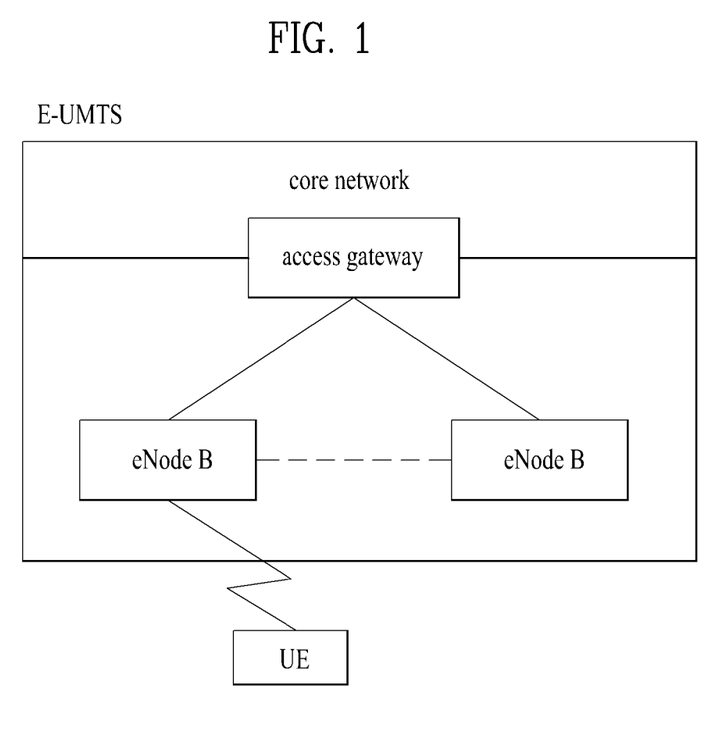
FIG. 1 is a schematic diagram of E-UMTS network structure as one example of a wireless communication system.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of transmitting a downlink control information in a wireless communication system and an apparatus therefor in the following description based on the discussion as mentioned in the foregoing description.

Technical Solution

To achieve these and other advantages and in accordance with the purpose of the present invention, as embodied and broadly described, according to one embodiment, a method of receiving a downlink signal, which is received by a user equipment from an eNode B in a wireless communication system includes the steps of receiving a downlink control information from the eNode B in a data region of a first subframe and receiving a downlink data in a data region of a second subframe based on the downlink control information, wherein the second subframe corresponds to an available subframe appearing after a predetermined number of subframe from the first subframe.

Meanwhile, to further achieve these and other advantages and in accordance with the purpose of the present invention, according to a different embodiment, a user equipment in a wireless communication system includes a radio communication module configured to transceive a signal with an eNode B and a processor configured to process the signal, if a downlink control information is received from the eNode B in a data region of a first subframe, the processor configured to control the radio communication module to receive a downlink data in a data region of a second subframe based on the downlink control information, wherein the second subframe corresponds to an available subframe appearing after a predetermined number of subframe from the first subframe.

In this case, the available subframe corresponds to a subframe capable of performing a downlink transmission.

Preferably, the predetermined number can be represented by an offset value of an index of the second subframe for an index of the first subframe and the downlink control information includes an information on the offset value.

More preferably, the downlink control information can include a scheduling information on a plurality of subframes. Specifically, the downlink control information can include a scheduling information on a predefined third subframe and a scheduling information on the second subframe. In this case, the second subframe corresponds to an available subframe appearing after a predetermined number of subframe from the third subframe.

Advantageous Effects

According to embodiments of the present invention, an eNode B can efficiently transmit downlink control information in a wireless communication system while avoiding inter-cell interference.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition.

Figure 2:
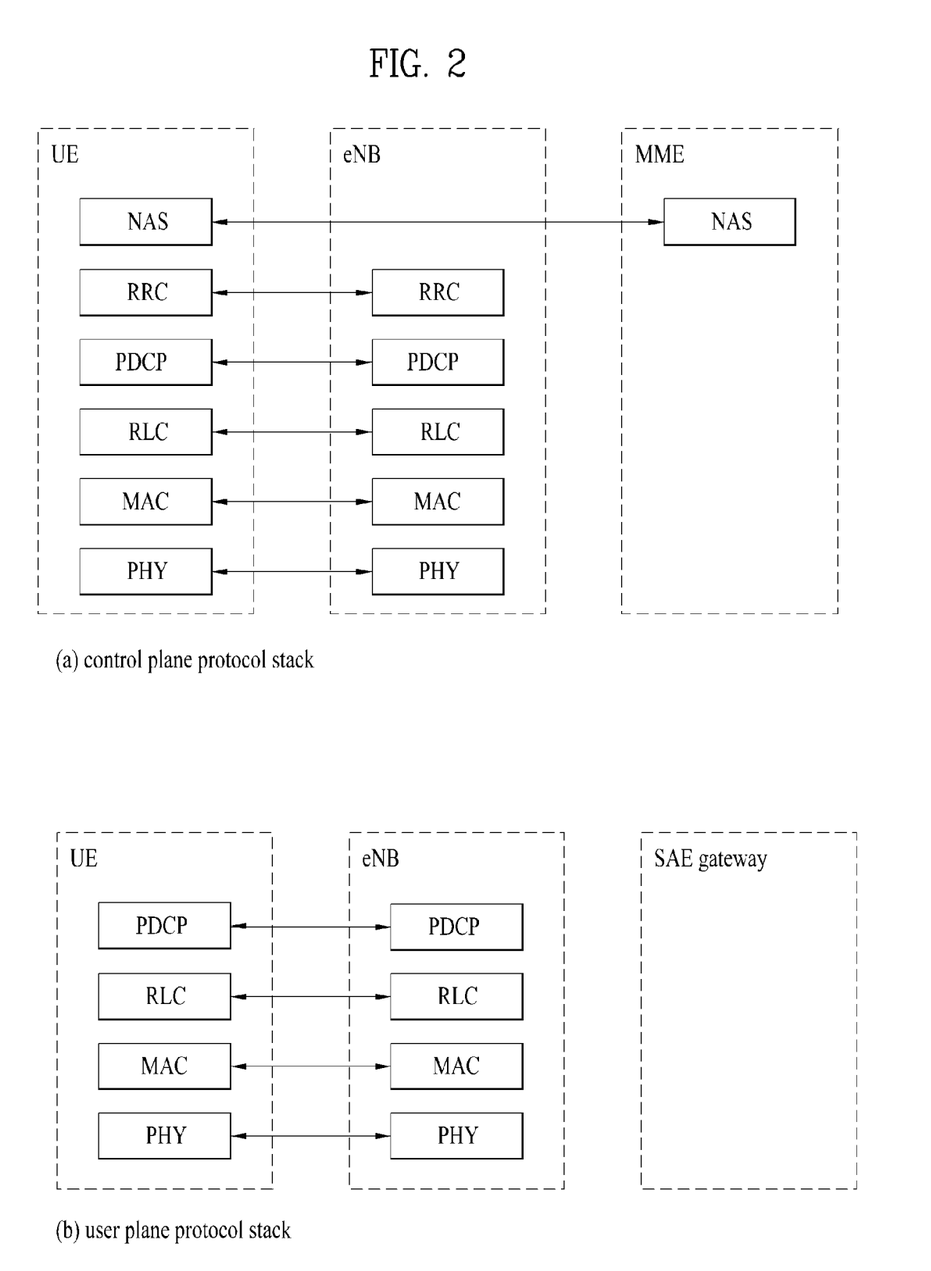
FIG. 2 is a diagram for structures of control and user planes of radio interface protocol between a 3GPP radio access network standard-based user equipment and E-UTRAN.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
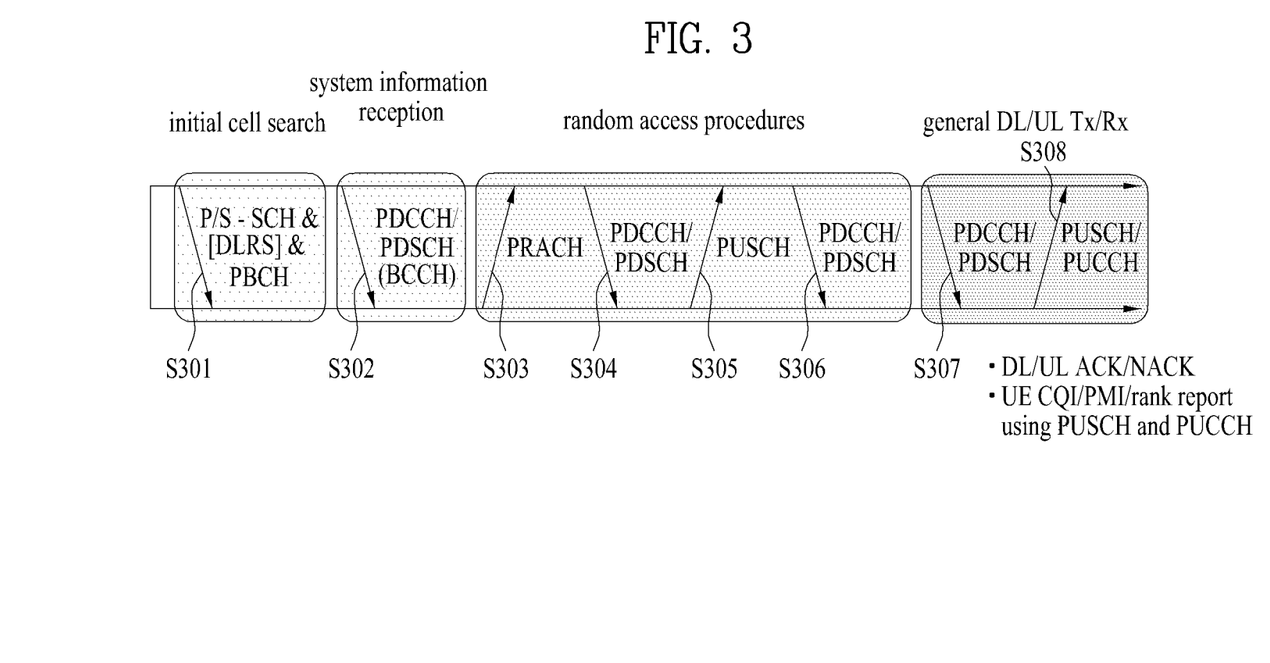
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may be then able to obtain information such as a cell ID and the like. Subsequently, the user equipment receives a physical broadcast channel from the eNode B and may be then able to obtain intra-cell broadcast information. Meanwhile, the user equipment receives a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure (RACH) to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
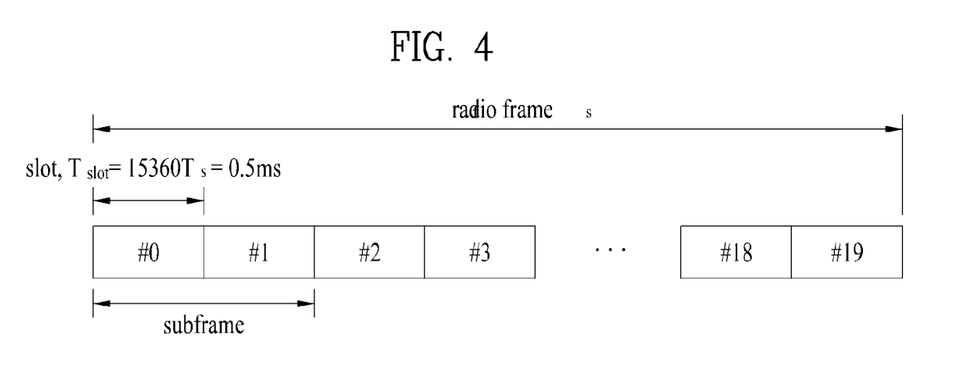
FIG. 4 is a diagram for a structure of a radio frame in LTE system.

FIG. 4 is a diagram for a structure of a radio frame used in an LTE system.

Referring to FIG. 4, one radio frame has a length of 10 ms ($327,200 \times T_S$) and is constructed with 10 subframes in equal size. Each of the subframes has a length of 1 ms and is constructed with two slots. Each of the slots has a length of 0.5 ms ($15,360 \times T_S$). In this case, $T_S$ indicates a sampling time and is represented as $T_S=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
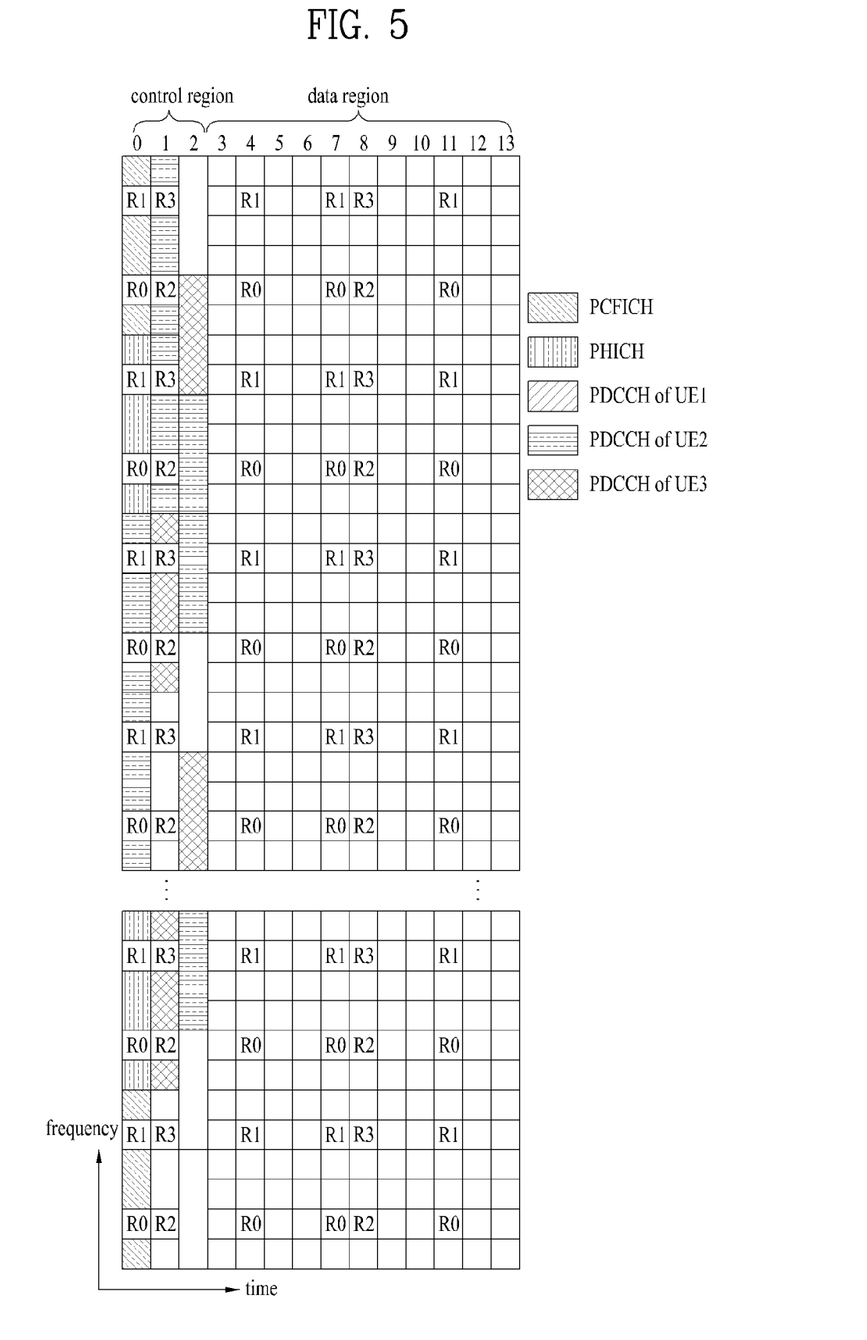
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS or a pilot signal) for an antenna 0 to 3. The RS is fixed as a constant pattern in the subframe irrespective of the control region and the data region. The control channel is allocated to a resource to which the RS is not allocated in the control region and a traffic channel is also allocated to a resource to which the RS is not allocated in the data region. The control channel allocated to the control region may include a physical control format indicator channel (PCFICH), a physical hybrid-ARQ indicator channel (PHICH), a physical downlink control channel (PDCCH) and the like.

The PCFICH is a physical control format indicator channel and informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH is a physical HARQ (hybrid-automatic repeat and request) indicator channel and used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH is a physical DL control channel and is allocated to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on where the data of the PDSCH is transmitted to which user equipment (one or a plurality of user equipments) and the information on how to receive and decode the PDSCH data by the user equipments and the like are transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transmission block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Recently, a concept of E-PDCCH (enhanced-PDCCH) has been proposed to reduce PDCCH performance drop caused by inter-cell interference or to resolve a lack of resources necessary for PDCCH.

Figure 6:
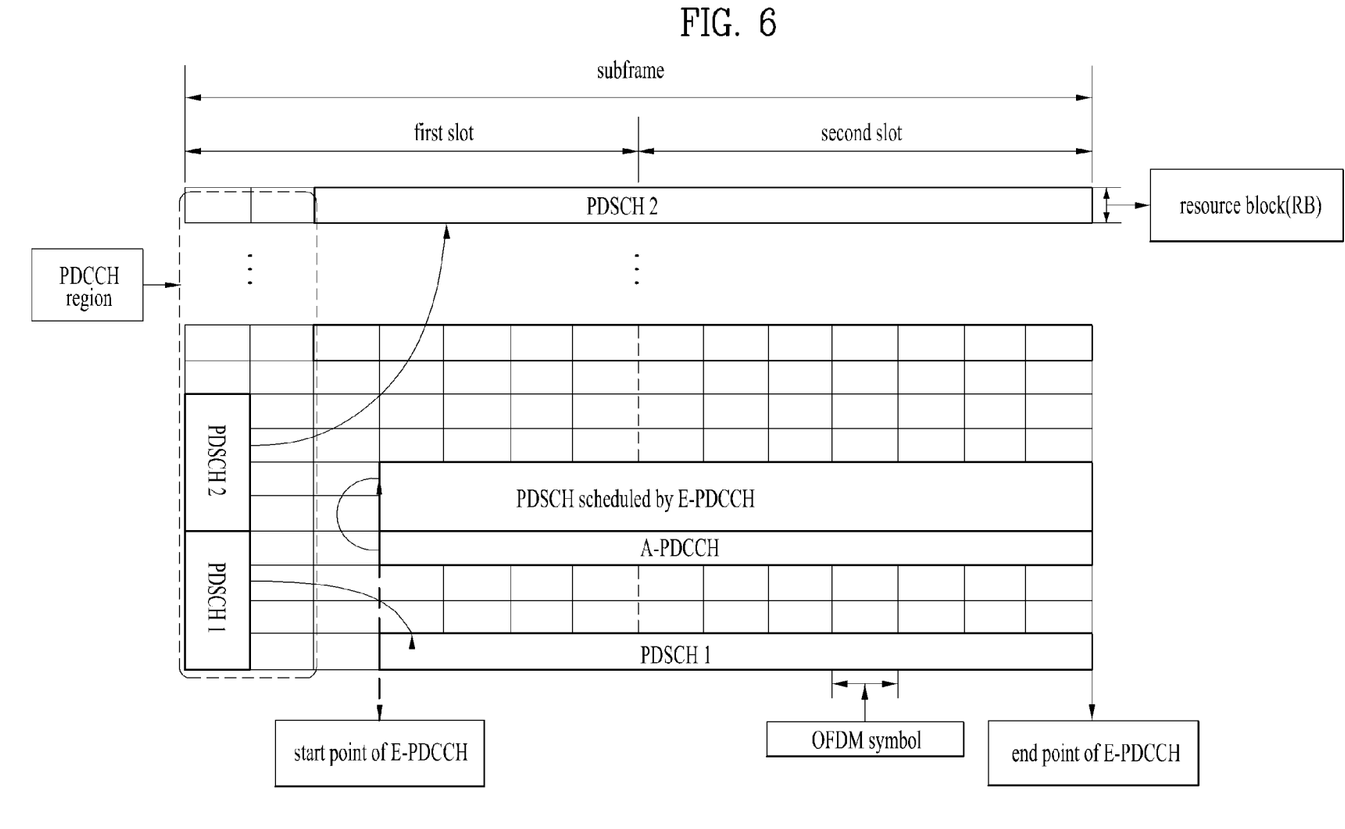
FIG. 6 is a diagram for explaining a concept of E-PDCCH (Enhanced-PDCCH)

FIG. 6 is a diagram for explaining a concept of E-PDCCH (Enhanced-PDCCH). In particular, FIG. 6 depicts a legacy PDCCH, PDSCH assigned by the PDCCH, E-PDCCH, and PDSCH region scheduled by the E-PDCCH in a manner of comparing with each other.

A length of frequency and time domain of E-PDCCH can be differently configured. In particular, an eNB can inform a UE of the length of time domain of E-PDCCH, in other word, information on a start symbol and an end symbol via an upper layer signaling, a physical control channel (e.g., a specific field of PDCCH), or a physical data channel. For instance, FIG. 7 indicates a case that the start symbol of E-PDCCH is configured with a fourth symbol of a first slot and the end symbol of E-PDCCH is configured with a last symbol of a second slot. Although it is not depicted in FIG. 7, E-PDCCH transmission can be ended on a symbol (e.g., a last symbol of a first slot) situating at a middle of a subframe.

The present invention proposes a method of solving a problem capable of being occurred when a control information on PDSCH is transmitted using the aforementioned E-PDCCH.

In case of using E-PDCCH in a TDD system, an UL ACK/NACK timing for PDSCH interlocked with E-PDCCH may have a case that a legacy UL ACK/NACK timing cannot be used as it is depending on an EP configuration of E-PDCCH due to 1) processing time required to generate UL ACK/NACK information and 2) limitation on a subframe capable of being used as a UL subframe under a specific UL/DL configuration. And, the aforementioned problem identically occurs in case of using E-PDCCH in a FDD system as well.

In order to solve the aforementioned problem, the present invention proposes that E-PDCCH indicates control information on PDSCH in a subframe after subframe from a subframe to which E-PDCCH is transmitted. A UE can report a PDSCH decoding result, i.e., an UL ACK/NACK in a subframe apart from a previously defined PDSCH as much as UL ACK/NACK transmission time interval on the basis of a subframe, which has received PDSCH.

By doing this, although a time relationship between the legacy PDSCH and the UL ACK/NACK is used without changing the time relationship, the time required to decode PDSCH can be sufficiently secured. In this case, it is preferable to use the 'M' as an indicator indicating a first available subframe after E-PDCCH is transmitted. And, an available subframe can be interpreted as a subframe capable of performing a downlink transmission. The 'M' can use a predetermined value, can be broadcasted by a cell-specific signaling, or can be delivered by a UE-specific RRC signaling.

Additionally, DL control information transmitted to E-PDCCH can include information capable of informing a user of control information on PDSCH of a subframe where the corresponding E-PDCCH indicates in a form of an offset value.

Figure 7:
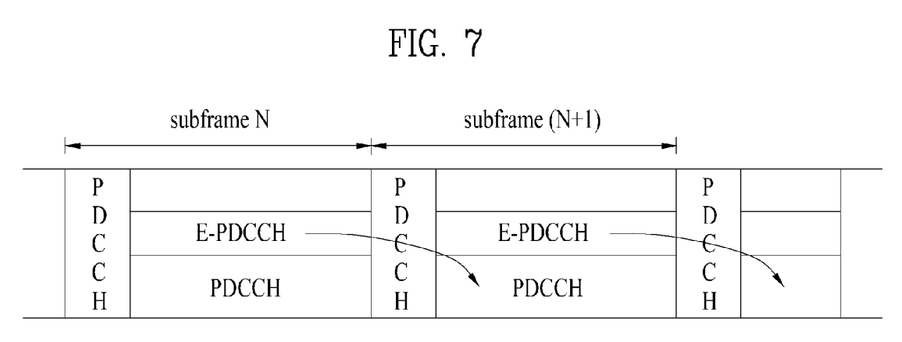
FIG. 7 is a diagram of an example of receiving E-PDCCH and PDSCH according to embodiment of the present invention.

FIG. 7 is a diagram of an example of receiving E-PDCCH and PDSCH according to embodiment of the present invention. In particular, assume that the 'M' is 1 in FIG. 7.

In particular, if E-PDCCH is transmitted in a subframe index N, PDSCH scheduled by the E-PDCCH is transmitted in a subframe index N+1.

In using a multiple subframe scheduling scheme, i.e., in using a scheme for transmitting control information of a plurality of subframes on PDCCH belonging to one subframe, it is apparent that the present invention can be applied to a case that E-PDCCH is used instead of the legacy PDCCH as well.

For instance, assumes a case that PDCCH transmitted in a subframe N schedules PDSCH of subframe N+K. If the case is applied to E-PDCCH of the present invention, E-PDCCH transmitted in the subframe N not only schedules PDSCH of subframe N+K but also schedules PDSCH of subframe N+K+M at the same time. In this case, the M is configured similar to the aforementioned description. In particular, the M can operate to indicate a first subframe among available subframes appearing after the subframe N+K.

The aforementioned present invention can be selectively applied to a case that an ending point of E-PDCCH is late, for instance, a case that time for decoding PDSCH is not sufficient because an E-PDCCH transmission ends after a specific symbol within a subframe. For instance, if the E-PDCCH transmission ends in a first slot of the subframe N, since a second slot of the subframe N can be utilized for the PDSCH decoding, E-PDCCH can operate to schedule PDSCH of the subframe N in this case. On the contrary, if the E-PDCCH transmission ends in the second slot of the subframe N, since the time for decoding PDSCH is not enough, E-PDCCH can operate to schedule PDSCH of a subframe N+M.

While PDCCH is transmitted using a CRS, E-PDCCH is transmitted based on a DM-RS, which is a UE-specific reference signal. Hence, E-PDCCH gets a significant impact according to a channel state and needs a scheme capable of promptly applying the channel state to stably deliver control information. To this end, the present invention additionally proposes that a previous E-PDCCH indicates position information (i.e., a candidate capable of being transmitted E-PDCCH or a resource capable of being transmitted E-PDCCH) of E-PDCCH in a specific subframe. In order to implement the present invention, such informations as (1) and (2) can be signaled to a UE.

(1) Information on a PRB pair set capable of being transmitted E-PDCCH in a following subframe
  A PRB pair capable of being transmitted E-PDCCH can be interpreted as a blind decoding region for a UE to obtain E-PDCCH. Hence, if the UE receives the corresponding information, the UE reconfigures a searching region based on the PRB pair set signaled in the following subframe and can perform a blind decoding.
(2) Information on a resource capable of being transmitted E-PDCCH for a corresponding UE in a following subframe As a different method, it is able to consider concretely signaling information on quantity and a position of a resource capable of being transmitted E-PDCCH for a corresponding UE. The information on the resource to which E-PDCCH is transmitted may include information on the PRB pair to which E-PDCCH is transmitted, information on an E-CCE transmitting E-PDCCH among CCEs (E-CCEs) corresponding to E-PDCCH existing in the PRB pair, information on an aggregation level, and the like. Hence, the UE can directly obtain E-PDCCH without a separate blind decoding.

In case of applying the present invention, an eNB can apply an adaptive scheduling to use a resource appropriate for a channel state by using the aforementioned informations as control information for a specific UE. In the description in the above, 'the following subframe' may correspond to a next subframe of a subframe for signaling information on E-PDCCH or may indicate that the corresponding control information is applied from a subframe apart from as much as an offset in a manner of adding subframe offset information to the signaling.

Figure 8:
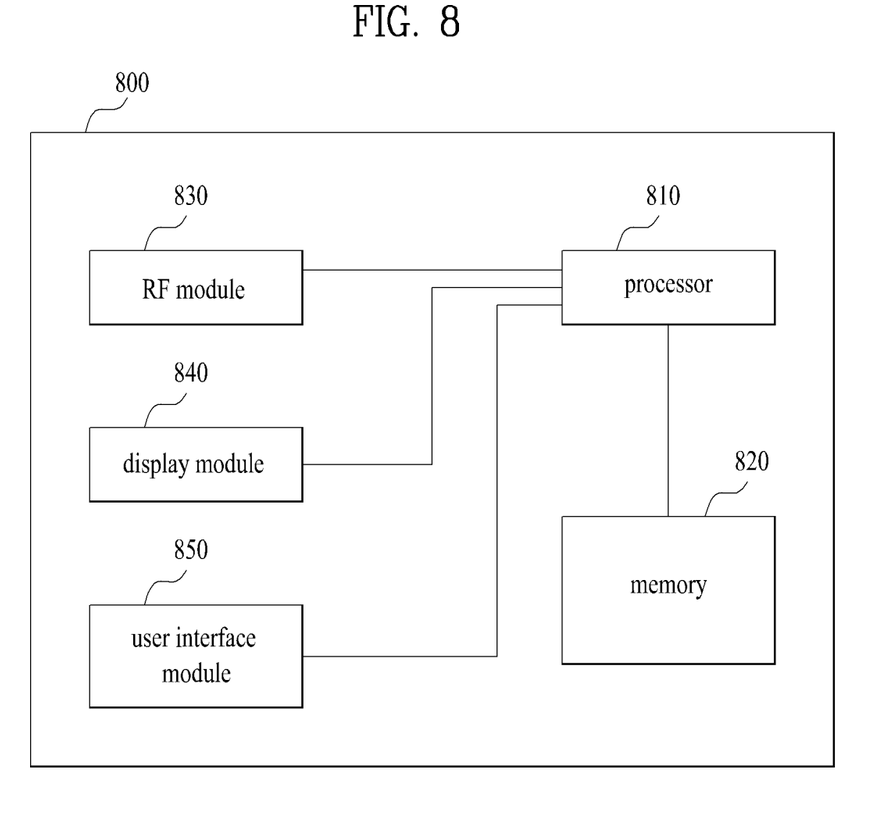
FIG. 8 is a block diagram of an example for a communication device according to one embodiment of the present invention.

FIG. 8 is a block diagram of an example for a communication device according to one embodiment of the present invention.

Referring to FIG. 8, a communication device 800 may include a processor 810, a memory 820, an RF module 830, a display module 840, and a user interface module 850.

Since the communication device 800 is depicted for clarity of description, prescribed module(s) may be omitted in part. The communication device 800 may further include necessary module(s). And, a prescribed module of the communication device 800 may be divided into subdivided modules. A processor 810 is configured to perform an operation according to the embodiments of the present invention illustrated with reference to drawings. In particular, the detailed operation of the processor 810 may refer to the former contents described with reference to FIG. 1 to FIG. 7.

The memory 820 is connected with the processor 810 and stores an operating system, applications, program codes, data, and the like. The RF module 830 is connected with the processor 810 and then performs a function of converting a baseband signal to a radio signal or a function of converting a radio signal to a baseband signal. To this end, the RF module 830 performs an analog conversion, amplification, a filtering, and a frequency up conversion, or performs processes inverse to the former processes. The display module 840 is connected with the processor 810 and displays various kinds of informations. And, the display module 840 can be implemented using such a well-known component as an LCD (liquid crystal display), an LED (light emitting diode), an OLED (organic light emitting diode) display and the like, by which the present invention may be non-limited. The user interface module 850 is connected with the processor 810 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transmitting/receiving a downlink control information in a wireless communication system and an apparatus therefor are described with reference to examples applied to 3GPP LTE system, it may be applicable to various kinds of wireless communication systems as well as the 3GPP LTE system.

What is claimed is:

1. A method for receiving a downlink signal from an eNode B at a user equipment in a wireless communication system, the method comprising:
  receiving, by the user equipment, a downlink control information from the eNode B in a data region of a first subframe; and
  receiving, by the user equipment, downlink data corresponding to downlink control information in a data region of a second subframe from the eNode B,
  wherein each of the first subframe and the second subframe is divided into a control region and the data region,
  wherein, when all symbols for the downlink control information are within a first slot of the first subframe, the second subframe is identical to the first subframe, and
  wherein, when the at least one symbol for the downlink control information is located on a second slot of the first subframe, the second subframe corresponds to an available subframe appearing after a predetermined number of subframes from the first subframe.

2. The method according to claim 1, wherein the predetermined number is represented by an offset value of an index of the second subframe for an index of the first subframe.

3. The method according to claim 2, wherein the downlink control information comprises an information on the offset value.

4. The method according to claim 1, wherein the downlink control information comprises scheduling information on a plurality of subframes.

5. The method according to claim 4, wherein the downlink control information comprises scheduling information on a predefined third subframe and scheduling information on the second subframe, and wherein the second subframe corresponds to an available subframe appearing after a predetermined number of subframes from the third subframe.

6. The method according to claim 1, wherein the available subframe corresponds to a subframe capable of performing a downlink transmission.

7. A user equipment in a wireless communication system, the user equipment comprising:

a radio communication module configured to transceive a signal with an eNode B; and a processor configured to:

process the signal, and, if downlink control information is received through the radio communication module from the eNode B in a data region of a first subframe, and control the radio communication module to receive downlink data corresponding to downlink control information in a data region of a second subframe from the eNode B, wherein each of the first subframe and the second subframe is divided into a control region and the data region, wherein, when all symbols for the downlink control information are within a first slot of the first subframe, the second subframe is identical to the first subframe, and wherein, when the at least one symbol for the downlink control information is located on a second slot of the first subframe, the second subframe corresponds to an available subframe appearing after a predetermined number of subframes from the first subframe.

8. The user equipment according to claim 7, wherein the predetermined number is represented by an offset value of an index of the second subframe for an index of the first subframe.

9. The user equipment according to claim 8, wherein the downlink control information comprises an information on the offset value.

10. The user equipment according to claim 7, wherein the downlink control information comprises scheduling information on a plurality of subframes.

11. The user equipment according to claim 10, wherein the downlink control information comprises scheduling information on a predefined third subframe and scheduling information on the second subframe, and wherein the second subframe corresponds to an available subframe appearing after a predetermined number of subframes from the third subframe.

12. The user equipment according to claim 7, wherein the available subframe corresponds to a subframe capable of performing a downlink transmission.

* * * * *